United States Patent
Qiu

(10) Patent No.: US 10,742,415 B2
(45) Date of Patent: Aug. 11, 2020

(54) METHOD AND APPARATUS FOR INTER-BLOCKCHAIN TRANSMISSION OF AUTHENTICABLE MESSAGE

(71) Applicant: Alibaba Group Holding Limited, George Town (KY)

(72) Inventor: Honglin Qiu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/783,112

(22) Filed: Feb. 5, 2020

(65) Prior Publication Data

US 2020/0177387 A1 Jun. 4, 2020

Related U.S. Application Data

(63) Continuation of application No. PCT/CN2020/071564, filed on Jan. 11, 2020.

(30) Foreign Application Priority Data

Jun. 28, 2019 (CN) .......................... 2019 1 0577305

(51) Int. Cl.
*H04L 9/32* (2006.01)
*G06F 16/23* (2019.01)

(52) U.S. Cl.
CPC ........ *H04L 9/3226* (2013.01); *G06F 16/2365* (2019.01); *G06F 16/2379* (2019.01); *H04L 9/3236* (2013.01); *H04L 2209/38* (2013.01)

(58) Field of Classification Search
CPC . H04L 9/3226; H04L 9/3236; H04L 2209/38; G06F 16/2379; G06F 16/2365
See application file for complete search history.

(56) References Cited

U.S. PATENT DOCUMENTS

2017/0352027 A1* 12/2017 Zhang ................... H04L 9/0825
2018/0373776 A1* 12/2018 Madisetti .............. H04L 9/3234

FOREIGN PATENT DOCUMENTS

CN 109426949 3/2017
CN 108600301 9/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Baotran N To
(74) *Attorney, Agent, or Firm* — Fish & Richardson P.C.

(57) ABSTRACT

A computer-implemented method, non-transitory, computer-readable medium, and computer-implemented system are provided for inter-blockchain, authenticable-message transmission. In an implementation, a first blockchain is connected to a relay. The relay is further connected to at least one other blockchain that includes a second blockchain. The method is performed by the first blockchain and includes saving first data on which a consensus is reached in the first blockchain by using a first account, where the first data includes an authenticable message, the authenticable message satisfies a predetermined protocol stack, and the first data is marked with a predetermined flag. The first data and first location information is provided to the relay, to provide the authenticable message to a second account in the second blockchain, where the first location information indicates a location of the first data in the first blockchain.

20 Claims, 15 Drawing Sheets

(56) References Cited

FOREIGN PATENT DOCUMENTS

| | | |
|---|---|---|
| CN | 108683630 | 10/2018 |
| CN | 109035012 | 12/2018 |
| CN | 110417742 | 11/2019 |
| CN | 110430235 | 11/2019 |
| CN | 110443704 | 11/2019 |
| WO | WO 2019072272 | 4/2019 |
| WO | WO 2019072273 | 4/2019 |

OTHER PUBLICATIONS

Nakamoto, "Bitcoin: A Peer-to-Peer Electronic Cash System," www.bitcoin.org, 2005, 9 pages.

Btcrelay.org [Online], "BTC Relay; A bridge between the Bitcoin blockchain & Ethereum smart contracts," Homepage, [Retrieved on Apr. 16, 2020], published on or before retrieval date, retrieved from: URL<http://btcrelay.org/>, 4 pages.

PCT International Search Report and Written Opinion in International Appln No. PCT/CN2020/071564, dated Apr. 13, 2020, 17 pages (with machine translation).

\* cited by examiner

Log (Topic)

From: Account of a second smart contract

To: Account of a first smart contract

Data: "Authenticable message"

FIG. 3

METHOD AND APPARATUS FOR INTER-BLOCKCHAIN TRANSMISSION OF AUTHENTICABLE MESSAGE

CROSS-REFERENCE TO RELATED APPLICATIONS

This application is a continuation of PCT Application No. PCT/CN2020/071564, filed on Jan. 11, 2020, which claims priority to Chinese Patent Application No. 201910577305.1, filed on Jun. 28, 2019, and each application is hereby incorporated by reference in its entirety.

TECHNICAL FIELD

Implementations of the present specification relate to the field of blockchain technologies, and more specifically, to a method and an apparatus for inter-blockchain transmission of an authenticable message.

BACKGROUND

A blockchain technology, also referred to as a distributed ledger technology, is a decentralized distributed database technology, and features decentralization, transparency, tamper-resistance, and trustworthiness. Each piece of data in a blockchain is broadcast to blockchain nodes in an entire network. As such, each node has full and consistent data. With the popularity of blockchain technologies, many different types of blockchains emerge, and are applied to fields such as the financial field, the health care field, the supply chain field, the asset management field, and the traceability field. However, most blockchain applications (cryptocurrencies or smart contracts) cannot cross the boundaries of current blockchains, and cannot cooperate with other blockchains to implement value circulation, and consequently the blockchain has limited space for play. Therefore, it has been explored how to enable different types of blockchains to cooperate to implement value circulation. Currently, there are a plurality of inter-blockchain technologies. However, each inter-blockchain technology has a unique design, and copes with different scenarios. For inter-blockchain in different scenarios, one blockchain may need to be connected to a plurality of inter-blockchain platforms.

Therefore, a more effective inter-blockchain information transmission solution is needed.

SUMMARY

Implementations of the present specification are intended to provide a more effective inter-blockchain information transmission solution, to alleviate the disadvantage in the existing technology.

To achieve the previous objective, an aspect of the present specification provides a method for inter-blockchain transmission of an authenticable message, where the inter-blockchain transmission means transmission from a first account in a first blockchain to another blockchain, the first blockchain is connected to a relay, the relay is further connected to at least one other blockchain, the at least one other blockchain includes a second blockchain, and the method is performed by the first blockchain, and includes the following: saving first data on which a consensus is reached in the first blockchain by using the first account, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, the first account, a second blockchain identifier, and a second account; and providing the first data and first location information to the relay, to provide the authenticable message to the second account in the second blockchain, where the first location information indicates a location of the first data in the first blockchain.

In an implementation, the saving first data on which a consensus is reached in the first blockchain by using the first account includes: saving the first data in the first blockchain by invoking a first smart contract by using the first account, where the first account imports at least the following parameters to the first smart contract when invoking the first smart contract: the second blockchain identifier, the second account, and message content.

In an implementation, the first data is marked with a predetermined flag.

In an implementation, the first data is a receipt, the receipt includes a log generated after the first smart contract is executed, and a data field of the log is the authenticable message.

In an implementation, the log is marked with a predetermined topic, and the predetermined flag is the predetermined topic.

In an implementation, the predetermined flag is an account identifier of the first smart contract.

In an implementation, the layer 1 protocol further includes a protocol version number field and a reserved field.

In an implementation, the layer 3 protocol further includes a type field used to indicate a usage scenario type of the authenticable message.

In an implementation, the type is any one of a message type, a remote procedure call type, and a publish/subscribe type.

In an implementation, the layer 3 protocol further includes a sequence number field used to indicate a current sending sequence number when the first account sends an authenticable message to the second account for a plurality of times.

In an implementation, the first account is a contract account of a second smart contract.

Another aspect of the present specification provides a method for inter-blockchain forwarding of an authenticable message, where the method is performed by a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, and the method includes the following: obtaining the first data and first location information from the first blockchain, where the first location information indicates a location of the first data in the first blockchain; and sending the first data and the first location information to the second blockchain based on the second blockchain identifier in the authenticable message.

In an implementation, the first data is marked with a predetermined flag, and the obtaining the first data and first location information from the first blockchain includes: obtaining the first data and the first location information from the first blockchain based on the predetermined flag.

Another aspect of the present specification provides a method for inter-blockchain receiving of an authenticable message, where the inter-blockchain receiving means receiving by a second account in a second blockchain from another blockchain, the second blockchain is connected to a relay, the second blockchain is synchronized, by using the relay, with at least one piece of second data related to at least one other blockchain, the at least one other blockchain includes a first blockchain, and the method is performed by the second blockchain, and includes the following: receiving first data and first location information from the relay, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and the second account, and the first location information indicates a location of the first data in the first blockchain; obtaining, based on the first blockchain identifier in the authenticable message, second data related to the first blockchain; verifying the authenticable message based on the first data, the second data related to the first blockchain, and the first location information; and providing the authenticable message to the second account based on the second account in the authenticable message after the verification succeeds.

In an implementation, the first data is a first receipt in a first block in the first blockchain, the first location information includes a block number of the first block and a receipt number of the first receipt in the first block, the second data related to the first blockchain is a block header of each block in the first blockchain, the verifying the authenticable message based on the first data, the second data related to the first blockchain, and the first location information includes: verifying the authenticable message by using a simplified payment verification method based on the first receipt, the block header of each block, and a Merkle tree path that is in the first block and associated with the first receipt, the first receipt comes from the first block in the first blockchain, and the Merkle tree path is obtained based on the first location information.

In an implementation, the authenticable message is located in a first log in the first receipt, and the verifying the authenticable message based on the first data, the second data related to the first blockchain, and the first location information further includes: verifying, based on a sending field of the first log, that the first account is an account that sends the authenticable message.

In an implementation, the second account is a contract account of a third smart contract, and the providing the authenticable message to the second account includes: providing the authenticable message to the second account by invoking the third smart contract by using the authenticable message as an imported parameter.

Another aspect of the present specification provides a method for inter-blockchain forwarding of an authenticable message, where the method is performed by a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, the relay is synchronized with second data related to each blockchain, and the method includes the following: obtaining the first data and first location information from the first blockchain, where the first location information indicates a location of the first data in the first blockchain; obtaining, based on the first blockchain identifier in the authenticable message, second data related to the first blockchain; verifying the authenticable message based on the first data, the second data related to the first blockchain, and the first location information; adding a digital signature to the authenticable message if the verification succeeds; and sending the authenticable message and the digital signature of the authenticable message to the second blockchain based on the second blockchain identifier in the authenticable message.

Another aspect of the present specification provides a method for inter-blockchain receiving of an authenticable message, where the inter-blockchain receiving means receiving by a second account in a second blockchain from another blockchain, the second blockchain is connected to a relay, the relay is further connected to at least one other blockchain, the at least one other blockchain includes a first blockchain, the second blockchain pre-stores a public key of the relay, and the method is performed by the second blockchain, and includes the following: receiving, from the relay, an authenticable message and a digital signature added by the relay to the authenticable message, where the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, a first account, a second blockchain identifier, and the second account; verifying the digital signature by using the public key of the relay; and providing the authenticable message to the second account based on the second account in the authenticable message after the verification succeeds.

Another aspect of the present specification provides an apparatus for inter-blockchain transmission of an authenticable message, where the inter-blockchain transmission means transmission from a first account in a first blockchain to another blockchain, the first blockchain is connected to a relay, the relay is further connected to at least one other blockchain, the at least one other blockchain includes a second blockchain, and the apparatus is deployed in the first blockchain, and includes the following: a saving unit, configured to save first data on which a consensus is reached in the first blockchain by using the first account, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, the first account, a second blockchain identifier, and a second account; and a providing unit, configured to provide the first data and first location information to the relay, to provide the authenticable message to the second account in the second blockchain, where the first location information indicates a location of the first data in the first blockchain.

In an implementation, the saving unit is further configured to save the first data in the first blockchain by invoking a first smart contract by using the first account, where the first account imports at least the following parameters to the first smart contract when invoking the first smart contract: the second blockchain identifier, the second account, and message content.

Another aspect of the present specification provides an apparatus for inter-blockchain forwarding of an authenticable message, where the apparatus is deployed in a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, and the apparatus includes the following: an acquisition unit, configured to obtain the first data and first location information from the first blockchain, where the first location information indicates a location of the first data in the first blockchain; and a sending unit, configured to send the first data and the first location information to the second blockchain based on the second blockchain identifier in the authenticable message.

In an implementation, the first data is marked with a predetermined flag, and the acquisition unit is further configured to obtain the first data and the first location information from the first blockchain based on the predetermined flag.

Another aspect of the present specification provides an apparatus for inter-blockchain receiving of an authenticable message, where the inter-blockchain receiving means receiving by a second account in a second blockchain from another blockchain, the second blockchain is connected to a relay, the second blockchain is synchronized, by using the relay, with at least one piece of second data related to at least one other blockchain, the at least one other blockchain includes a first blockchain, and the apparatus is deployed in the second blockchain, and includes the following: a receiving unit, configured to receive first data and first location information from the relay, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and the second account, and the first location information indicates a location of the first data in the first blockchain; an acquisition unit, configured to obtain, based on the first blockchain identifier in the authenticable message, second data related to the first blockchain; a verification unit, configured to verify the authenticable message based on the first data, the second data related to the first blockchain, and the first location information; and a providing unit, configured to provide the authenticable message to the second account based on the second account in the authenticable message after the verification succeeds.

In an implementation, the first data is a first receipt in a first block in the first blockchain, the first location information includes a block number of the first block and a receipt number of the first receipt in the first block, the second data related to the first blockchain is a block header of each block in the first blockchain, the verification unit is further configured to verify the authenticable message by using a simplified payment verification method based on the first receipt, the block header of each block, and a Merkle tree path that is in the first block and associated with the first receipt, the first receipt comes from the first block in the first blockchain, and the Merkle tree path is obtained based on the first location information.

In an implementation, the authenticable message is located in a first log in the first receipt, and the verification unit is further configured to verify, based on a sending field of the first log, that the first account is an account that sends the authenticable message.

In an implementation, the second account is a contract account of a third smart contract, and the providing unit is further configured to provide the authenticable message to the second account by invoking the third smart contract by using the authenticable message as an imported parameter.

Another aspect of the present specification provides an apparatus for inter-blockchain forwarding of an authenticable message, where the apparatus is deployed in a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, the relay is synchronized with second data related to each blockchain, and the apparatus includes the following: a first acquisition unit, configured to obtain the first data and first location information from the first blockchain, where the first location information indicates a location of the first data in the first blockchain; a second acquisition unit, configured to obtain, based on the first blockchain identifier in the authenticable message, second data related to the first blockchain; a verification unit, configured to verify the authenticable message based on the first data, the second data related to the first blockchain, and the first location information; a signature unit, configured to add a digital signature to the authenticable message if the verification succeeds; and a sending unit, configured to send the authenticable message and the digital signature of the authenticable message to the second blockchain based on the second blockchain identifier in the authenticable message.

Another aspect of the present specification provides an apparatus for inter-blockchain receiving of an authenticable message, where the inter-blockchain receiving means receiving by a second account in a second blockchain from another blockchain, the second blockchain is connected to a relay, the relay is further connected to at least one other blockchain, the at least one other blockchain includes a first blockchain, the second blockchain pre-stores a public key of the relay, and the apparatus is deployed in the second blockchain, and includes the following: a receiving unit, configured to receive, from the relay, an authenticable message and a digital signature added by the relay to the authenticable message, where the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, a first account, a second blockchain identifier, and the second account; a verification unit, configured to verify the digital signature by using the public key of the relay; and a providing unit, configured to provide the authenticable message to the second account based on the second account in the authenticable message after the verification succeeds.

Another aspect of the present specification provides a computer readable storage medium, where the computer readable storage medium stores a computer program, and when the computer program is executed in a computer, the computer is enabled to perform any one of the previous methods.

Another aspect of the present specification provides a computing device, including a memory and a processor, where the memory stores executable code, and when the processor executes the executable code, any one of the previous methods is implemented.

Based on the inter-blockchain solutions in the implementations of the present specification, an authenticable message is designed, so that a message sent from a blockchain can be authenticated by another blockchain: The blockchain from which the message is sent and an entity (an account/contract) that is in the blockchain and sends the message can be determined. Based on the authenticable message, inter-blockchain application (contract) programming is allowed, and therefore developers can easily develop various inter-blockchain services and applications.

BRIEF DESCRIPTION OF DRAWINGS

Implementations of the present specification are described with reference to the accompanying drawings, so that the implementations of the present specification can be made more clearer:

FIG. 3 is a schematic diagram illustrating a log generated after a first smart contract is executed;

DESCRIPTION OF IMPLEMENTATIONS

The following describes the implementations of the present specification with reference to the accompanying drawings.

Figure 1:
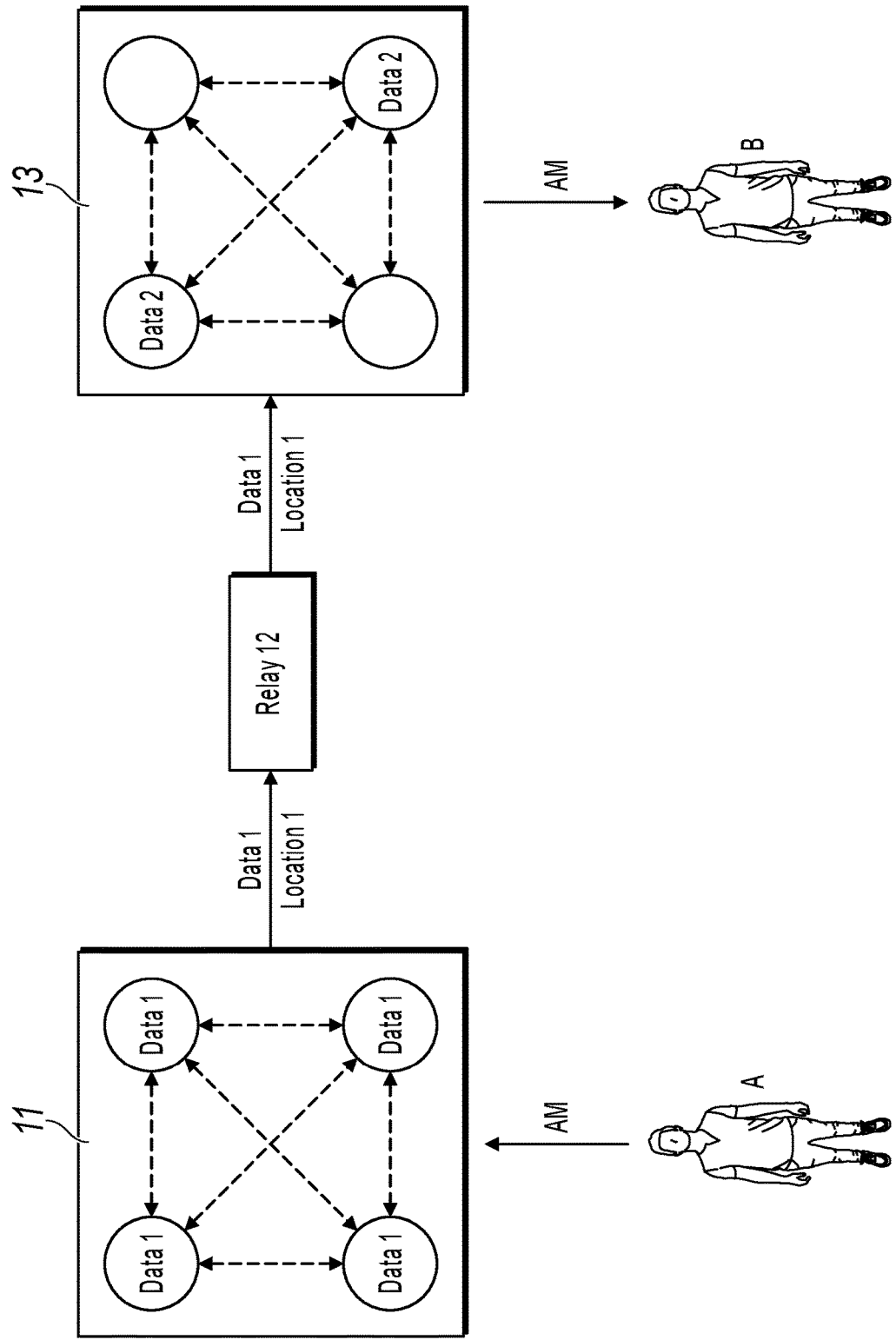
FIG. 1 is a schematic diagram illustrating an inter-blockchain system, according to an implementation of the present specification.

FIG. 1 is a schematic diagram illustrating an inter-blockchain system, according to an implementation of the present specification. As shown in FIG. 1, the inter-blockchain system includes a first blockchain 11, a relay 12, and a second blockchain 13. The first blockchain 11 includes, for example, account A, and the second blockchain 13 includes, for example, account B. Account A and account B can be user accounts, or can be contract accounts. When account A in the first blockchain wants to send information to account B in the second blockchain, account A can send information in the form of an authenticable message (AM message). The authenticable message is included in first data (data 1) of account A that is saved in the blockchain and on which a consensus is reached. The second blockchain 13 can include, for example, a plurality of simplified payment verification (spy) nodes. The node locally obtains second data (data 2) in the first blockchain 11 in advance, and data 2 is used to verify data 1. The spy node can obtain the first data (data 1) and location information (location 1) of the first data through forwarding by the relay 12 between the first blockchain 11 and the second blockchain 13, verify data 1 by using data 2, and provide the AM message in data 1 to account B after the verification succeeds. Then, account B can perform service processing based on the AM message.

It can be understood that the description with reference to FIG. 1 is merely an example, and is not intended to limit the present implementation of the present specification. For example, after obtaining data 1, the relay can verify and add a digital signature to data 1 based on data 2 that is in the first blockchain and obtained in advance, and send the digital signature to the second blockchain. The second blockchain can verify the digital signature based on a public key of the relay, to verify data 1.

The following describes the previous process in detail.

Figure 2:
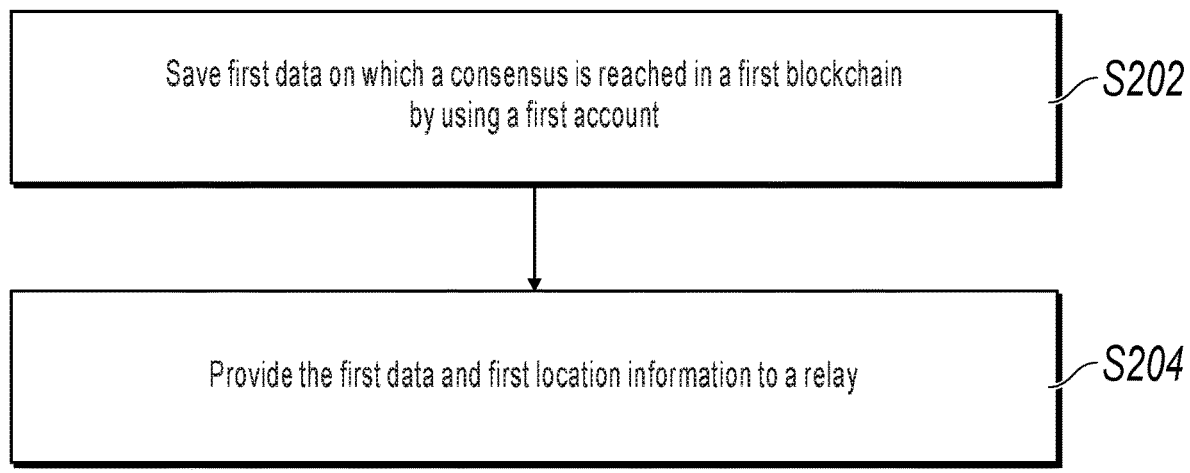
FIG. 2 is a flowchart illustrating a method for inter-blockchain transmission of an authenticable message, according to an implementation of the present specification.

FIG. 2 is a flowchart illustrating a method for inter-blockchain transmission of an authenticable message, according to an implementation of the present specification. The inter-blockchain transmission means transmission from a first account in a first blockchain to another blockchain, the first blockchain is connected to a relay, the relay is further connected to at least one other blockchain, the at least one other blockchain includes a second blockchain, and the method is performed by the first blockchain, and includes the following steps.

Step S202: Save first data on which a consensus is reached in the first blockchain by using the first account, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, the first account, a second blockchain identifier, and a second account.

Step S204: Provide the first data and first location information to the relay, to provide the authenticable message to the second account in the second blockchain, where the first location information indicates a location of the first data in the first blockchain.

In the present implementation of the present specification, the first blockchain and the second blockchain can be any blockchain, for example, a bitcoin blockchain or an Ethereum blockchain. The first blockchain and the second blockchain transmit information by using an authenticable message in a uniform format. Therefore, a type of the blockchain and a specific application scenario are not limited in the present implementation of the present specification. The relay is middleware connected between the first blockchain and the second blockchain, and the relay can be in a plurality of forms. For example, the relay can be a node in both the first blockchain and the second blockchain, in other words, the relay has an account in both the first blockchain and the second blockchain. Alternatively, the relay is a forwarding apparatus connected to both the first blockchain and the second blockchain, is not responsible for data verification, and is only used for data forwarding. Alternatively, the relay is a trusted node, verifies data after receiving the data from the first blockchain, and sends the data to the second blockchain after the verification succeeds. Alternatively, the relay can be a verification blockchain, and perform consensus verification on data received from the first blockchain before sending the data to the second blockchain.

In step S202, the first data on which a consensus is reached is saved in the first blockchain by using the first account, where the first data includes the authenticable message, the authenticable message satisfies the predetermined protocol stack, the predetermined protocol stack includes the layer 1 to layer 3 protocols from the exterior to the interior, the layer 1 protocol includes the sending blockchain identifier field, the receiving blockchain identifier field, and the layer 2 protocol, the layer 2 protocol includes the sending account field, the receiving account field, and the layer 3 protocol, the layer 3 protocol includes the message content field, and the sending blockchain identifier field, the sending account field, the receiving blockchain identifier field, and the receiving account field respectively correspond to the following field values: the first blockchain identifier, the first account, the second blockchain identifier, and the second account.

The first account can be a user account, or can be a contract account. The first data can be any of a transaction or a receipt in the blockchain, a state in a state tree, or any data in a smart contract storage device, or a relational database, and the data is saved in the blockchain after nodes reach a consensus. Therefore, the first data is consistent and verifiable at the nodes. A person skilled in the art knows that data on which a consensus is reached can be saved in a blockchain by sending a transaction in the blockchain. Details of this process are omitted here.

In an implementation, the saving first data on which a consensus is reached in the first blockchain by using the first account includes: saving the first data in the first blockchain by invoking a first smart contract by using the first account, where the first account imports at least the following parameters to the first smart contract when invoking the first smart contract: the second blockchain identifier, the second account, and message content. In an implementation, the first account is a contract account of a second smart contract. For example, the first account imports parameters to a third smart contract in the second blockchain by invoking the first smart contract, to implement inter-blockchain invocation of the third smart contract. The first smart contract is a specific smart contract used to save the first data in the first blockchain to implement inter-blockchain transmission of an authenticable message. For example, the first smart contract can be invoked by a contract (namely, the second smart contract) for sending information. During invoking, at least a receiving blockchain identifier (namely, the second blockchain identifier), a receiving account identifier (namely, the second account), and the message content need to be imported.

When the first smart contract is executed, for example, the first smart contract includes a save function "Save( )". Imported parameters of the save function are imported parameters of the first smart contract, namely, the second blockchain identifier, the second account, and the message content. In addition, the save function obtains an account (namely, the first account) of the second smart contract from the second smart contract that initiates invocation, combines, in a predetermined format (namely, the predetermined protocol stack), the first account, the predetermined first blockchain identifier, and the parameters (namely, the second blockchain identifier, the second account, and the message content) imported during invocation into the authenticable message, and outputs the authenticable message as a function result, to save the function result in a corresponding log. The log is included in a transaction receipt of a transaction corresponding to the current invocation, and the transaction receipt is saved in a block in the first blockchain after the node in the first blockchain performs consensus verification. In other words, in the present implementation, the first data is a receipt in the blockchain, and a specific log in the receipt includes the authenticable message. In the block in the blockchain, the receipt can be identified, for example, by using a contract identifier of the first smart contract as a predetermined flag. In an implementation, in the log, a specific topic (name) is set as the predetermined flag for subsequent searching for the receipt and the log. It can be understood that when the first data is a receipt, the first data needs to be marked with the predetermined flag for subsequent searching. However, the first data is not limited to a receipt. For example, the first data can be data saved in the smart contract storage device or data saved in the relational database. In this case, no predetermined flag needs to be marked, and the first data can be directly obtained from the specific database (or memory).

After the first smart contract is executed by invoking the first smart contract by using the second smart contract, for example, a log shown in FIG. 3 is generated. FIG. 3 is a schematic diagram illustrating a log generated after the first smart contract is executed. As shown in FIG. 3, the log has a predetermined topic. For example, the topic can be preset to "AM", to indicate that the log is a log used to send an AM message to one or more recipients external to the blockchain. The log includes a "to" field, a "from" field, and a "data" field. The "to" field corresponds to an account of an invoked contract, namely, an account of the first smart contract, the "from" field corresponds to an account of a contract that initiates the invocation, namely, the account (namely, the first account) of the second smart contract, and the "data" field includes the authenticable message that the second smart contract wants to send.

Figure 4:
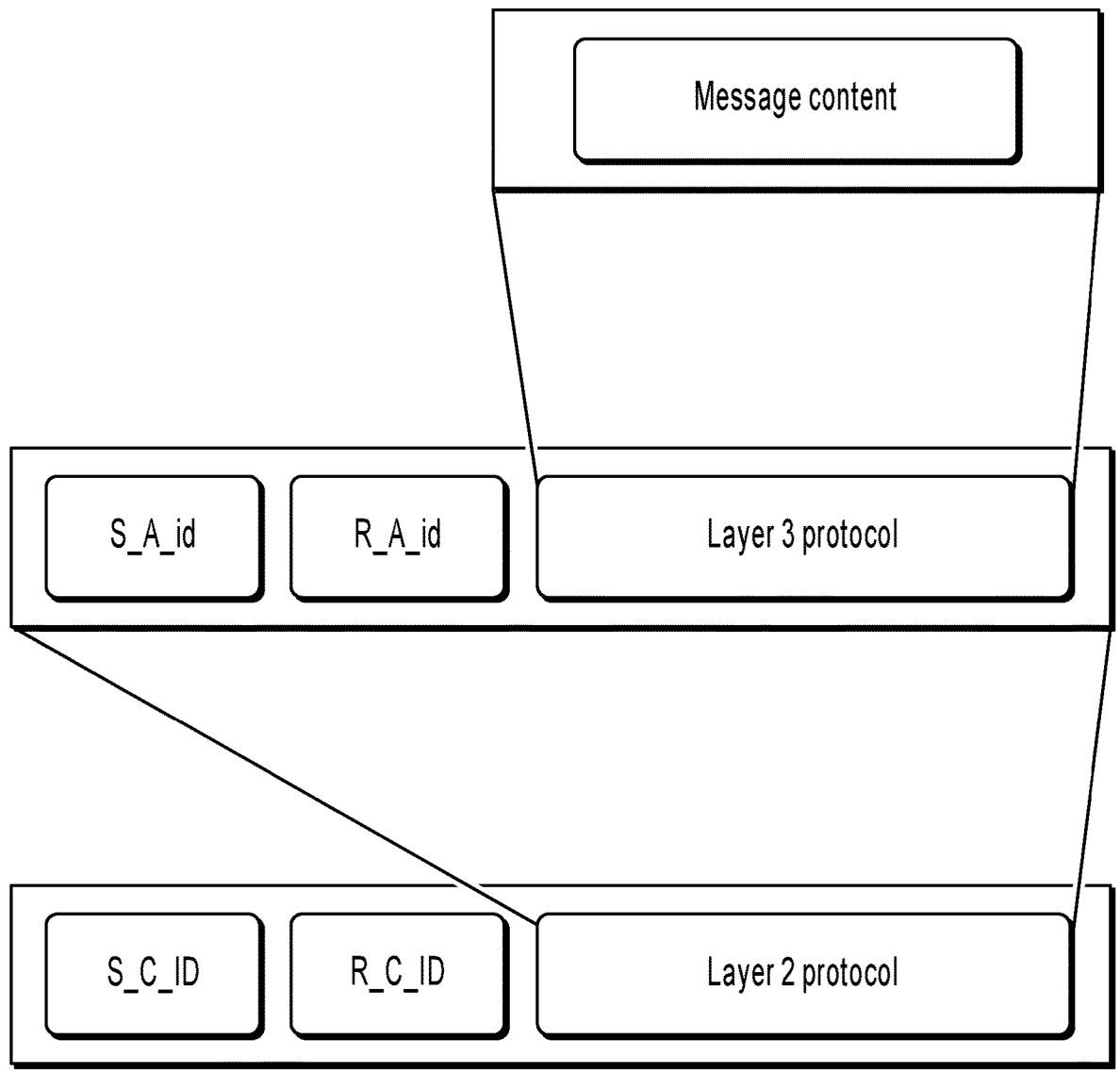
FIG. 4 is a schematic diagram illustrating a predetermined protocol stack, according to an implementation of the present specification.

The authenticable message satisfies the predetermined protocol stack. FIG. 4 is a schematic diagram illustrating a predetermined protocol stack, according to an implementation of the present specification. As shown in FIG. 4, the lowest layer in the figure is the layer 1 protocol according to the present implementation of the present specification, and the layer 1 protocol includes the sending blockchain identifier field (S_C_ID), the receiving blockchain identifier field (R_C_ID), and the layer 2 protocol. The middle layer in the figure is the layer 2 protocol, and the layer 2 protocol includes the sending account field (S_A_id), the receiving account field (R_A_id), and the layer 3 protocol. The upper layer in the figure is the layer 3 protocol, and the layer 3 protocol includes the message content field. It can be understood that a sending account is an account in a sending blockchain, and a receiving account is an account in a receiving blockchain.

Figure 5:
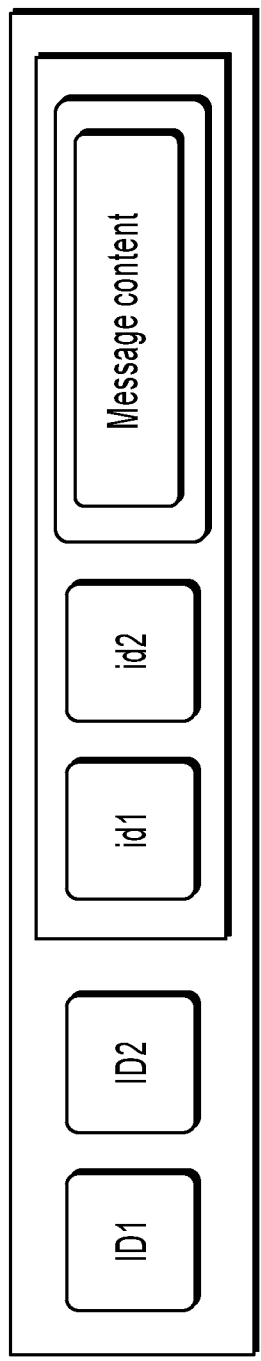
FIG. 5 illustrates a schematic form of an authenticable message.

For example, as described above, the authenticable message is a message sent from the first account in the first blockchain to the second account in the second blockchain. Assume that the first blockchain identifier is ID1, the first account is id1, the second blockchain identifier is ID2, and the second account is id2. In this case, FIG. 5 illustrates a schematic form of the authenticable message. As shown in FIG. 5, based on the protocol stack shown in FIG. 4, the layer 1 protocol includes ID1, ID2, and the layer 2 protocol, the layer 2 protocol includes id1, id2, and the layer 3 protocol, and the layer 3 protocol includes the message content.

The protocol stack is designed based on a transmission process of the authenticable message. The layer 1 protocol corresponds to transmission from the first blockchain to the second blockchain, the layer 2 protocol corresponds to transmission from the first account to the second account, and the layer 3 protocol corresponds to a specific service processing process based on the message content after transmission to the second account. The protocol stack is designed in this way, so that in the process of transmitting the authenticable message, the authenticable message can be hierarchically read from an external layer to an internal layer. To be specific, ID2 in the layer 1 protocol is first read to transmit the authenticable message to the second blockchain, then id2 in the layer 2 protocol is read to transmit the authenticable message to the second account, and finally, the message content in the layer 3 protocol is read and provided to the second account, so that the second account performs specific service processing based on the message content.

In an implementation, the layer 1 protocol further includes a protocol version number field and a reserved field, to allow upgrading and expansion of the protocol stack. The reserved field is an empty field.

In an implementation, the layer 3 protocol further includes a type field used to indicate a usage scenario type of the authenticable message, so that the protocol stack can be repeatedly used for each usage scenario. For example, for different usage scenarios (namely, different types in the authenticable message), the message content field can correspond to different content, have different formats, etc. The type is any one of a message type, a remote procedure call type, a publish/subscribe type, etc.

The layer 3 protocol further includes a sequence number field used to indicate a current sending sequence number when the first account sends an authenticable message to the second account for a plurality of times.

Similarly, field values corresponding to the protocol version number field, the reserved field, the type field, the sequence number field, etc. can be imported to the first smart contract as input parameters when the first account invokes the first smart contract, so that the save function in the first smart contract can output, based on these input parameters, an authenticable message including these field values.

Figure 6:
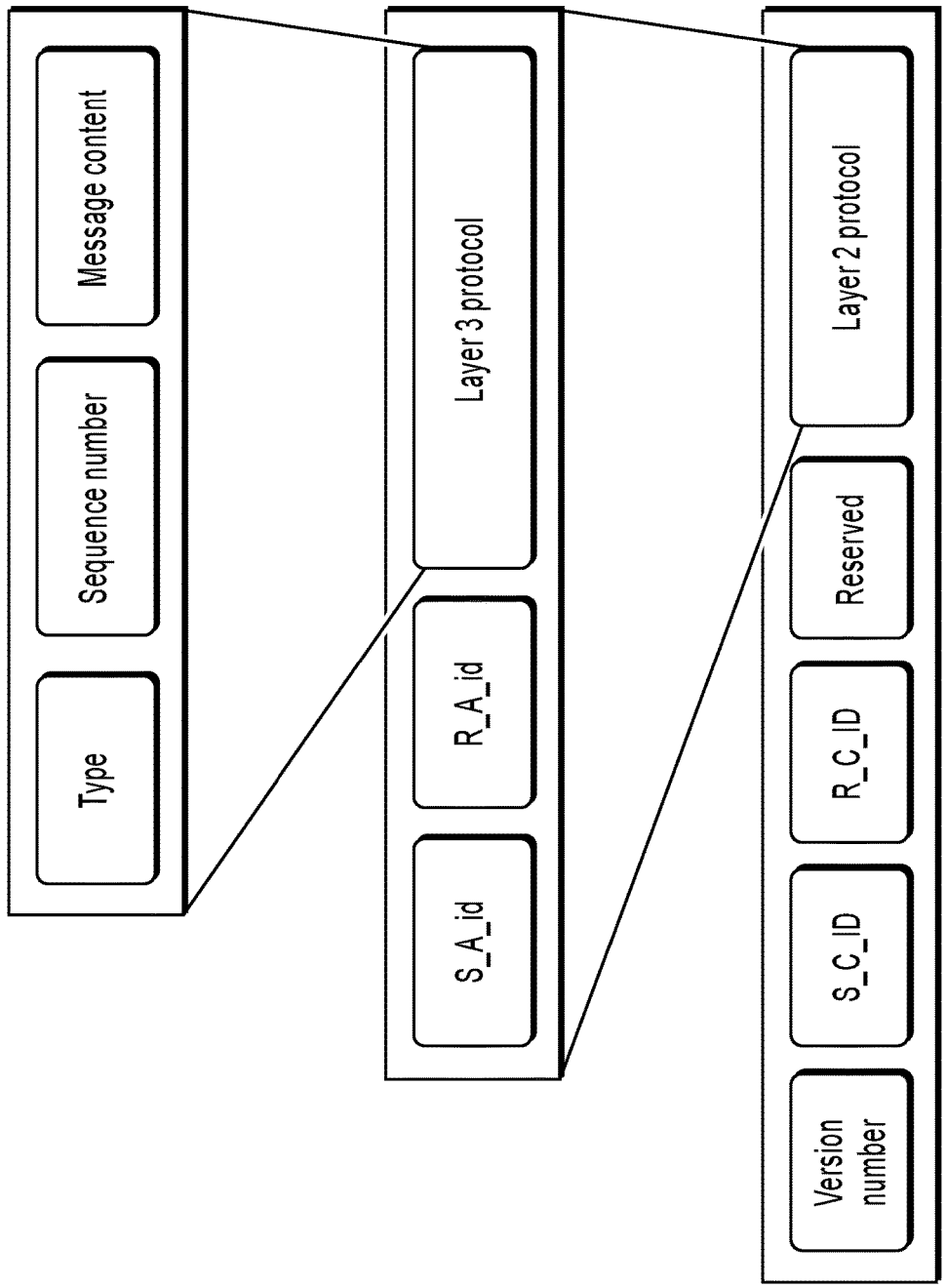
FIG. 6 is a schematic diagram illustrating a protocol stack of high applicability, according to an implementation of the present specification.

FIG. 6 is a schematic diagram illustrating a protocol stack of high applicability, according to an implementation of the present specification. As shown in FIG. 6, compared with the protocol stack shown in FIG. 4, the layer 1 protocol of the protocol stack further includes a version number field and a reserved field, and the layer 3 protocol of the protocol stack further includes a type field and a sequence number field. As described above, the protocol stack can be upgraded and expanded, can be used for a plurality of scenario types, and can be used for communication for a plurality of times. Therefore, the protocol stack features high applicability.

Although the process of saving a receipt on which a consensus is reached in the first blockchain is described above by using an example of invoking the first smart contract by using the second smart contract, the present implementation of the present specification is not limited thereto. For example, the first account is a user account, and the first account can send a transaction to any other account, to save the first data in the blockchain. For example, the first data can be transaction data in a block. For example, a predetermined flag can be preset in a data field of the transaction, to indicate that the transaction is a transaction used for inter-blockchain transmission of information, and the data field of the transaction includes the authenticable message. Therefore, after the first account sends the transaction, the transaction is saved in the block after consensus verification is performed. In a subsequent process, the transaction data can be identified by using the predetermined flag, and the authenticable message is obtained from the transaction data.

In step S204, the first data and the first location information are provided to the relay, to provide the authenticable message to the second account in the second blockchain, where the first location information indicates the location of the first data in the first blockchain.

As described above, in the present implementation of the present specification, different relays can be used, and the first data can be provided to the relays by using different methods based on different implementations of the relays. For example, the relay is a node in the first blockchain and the second blockchain. In this case, the relay can obtain both the first data and the first location information from locally stored data (for example, a block or a state tree), where the first location information indicates the location of the first data in the blockchain. For example, when the first data is a receipt, the first location information includes a number of a block in which the receipt is located, a number of the receipt in the block, etc. For example, the relay is a forwarding apparatus connected to both the first blockchain and the second blockchain. In this case, any node in the first blockchain can locally obtain the first data and the location information of the first data based on a request of the relay, and send the first data and the location information of the first data to the relay. After obtaining the first data and the location information of the first data, the relay performs different steps based on a different form of the relay, to provide the authenticable message in the first data to the second account in the second blockchain. The process is described in detail below.

Figure 7:
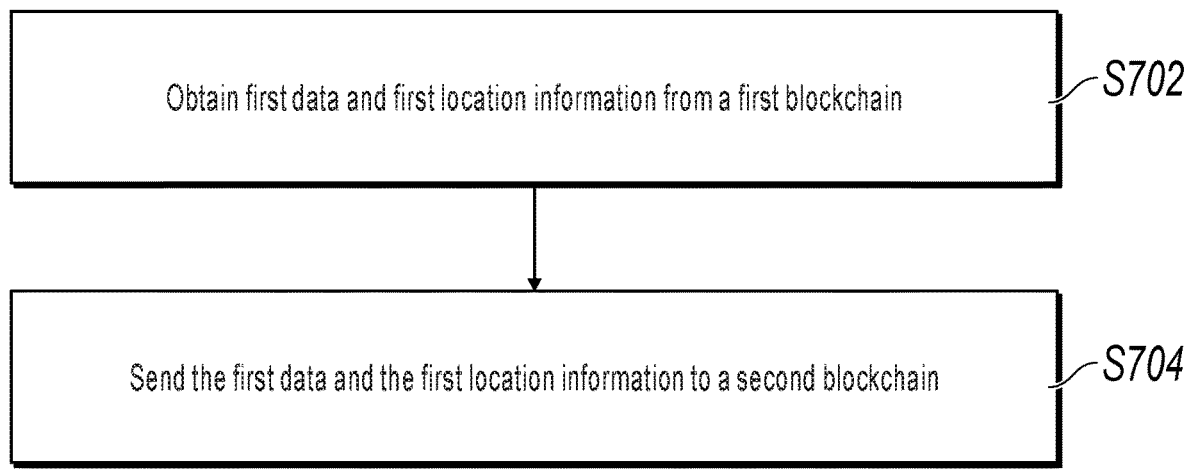
FIG. 7 is a flowchart illustrating a method for inter-blockchain forwarding of an authenticable message, according to an implementation of the present specification.

FIG. 7 is a flowchart illustrating a method for inter-blockchain forwarding of an authenticable message, according to an implementation of the present specification. The method is performed by a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, and the method includes the following steps:

Step S702: Obtain the first data and first location information from the first blockchain, where the first location information indicates a location of the first data in the first blockchain.

Step S704: Send the first data and the first location information to the second blockchain based on the second blockchain identifier in the authenticable message.

After the method shown in FIG. 2 is performed in the first blockchain, the first data on which a consensus is reached is saved in the first blockchain, so that the method can be performed.

The method is performed by the relay, and method steps performed by the relay vary with a specific implementation of the relay. In the method, the relay is a forwarding end between the first blockchain and the second blockchain, that is, the relay does not perform data verification, is only used for data forwarding, and is not responsible for data authenticity and integrity.

In step S702, the first data and the first location information are obtained from the first blockchain, where the first location information indicates the location of the first data in the first blockchain.

In an implementation, the first data is saved in the blockchain with a predetermined flag, and the predetermined flag is used to search for data used for inter-blockchain transmission. For example, the predetermined flag is an account of a first smart contract, and another contract account invokes the first smart contract when wanting inter-blockchain transmission of information. After the first smart contract is invoked, the account of the first smart contract is included in a corresponding receipt, so that based on the account of the first smart contract, a block can be searched for the receipt, where the receipt is used as the first data, and an identifier of a block in which the receipt is located, a receipt number of the receipt in the block, etc. can be determined and used as the first location information. For example, the relay can subscribe to the receipt that includes the account of the first smart contract and is in the block from any node, to receive the first data and the first location information from the node. As described above, when the first data is specific data, the first data and a storage location of the first data can be obtained from a specific database or memory.

In step S704, the first data and the first location information are sent to the second blockchain based on the second blockchain identifier in the authenticable message.

After the relay obtains the first data and the first location information, for example, when the first data is a receipt for invoking the first smart contract, the relay identifies a specific log from the receipt by using the account of the first smart contract or a predetermined topic of the log, and obtains the authenticable message from a data field of the specific log. Based on the predetermined protocol stack, it can be determined that the "second blockchain identifier" in the authenticable message is an identifier of a blockchain that is to receive the authenticable message, and therefore the first data and the first location information can be sent to the second blockchain. It can be understood that the relay can be connected to more than two blockchains, and for example, can be further connected to a third blockchain and a fourth blockchain. Therefore, after obtaining the first data and the first location information, the relay performs data sending based on the second blockchain identifier, namely, an addressing process of a receiving blockchain based on the receiving blockchain identifier.

Figure 8:
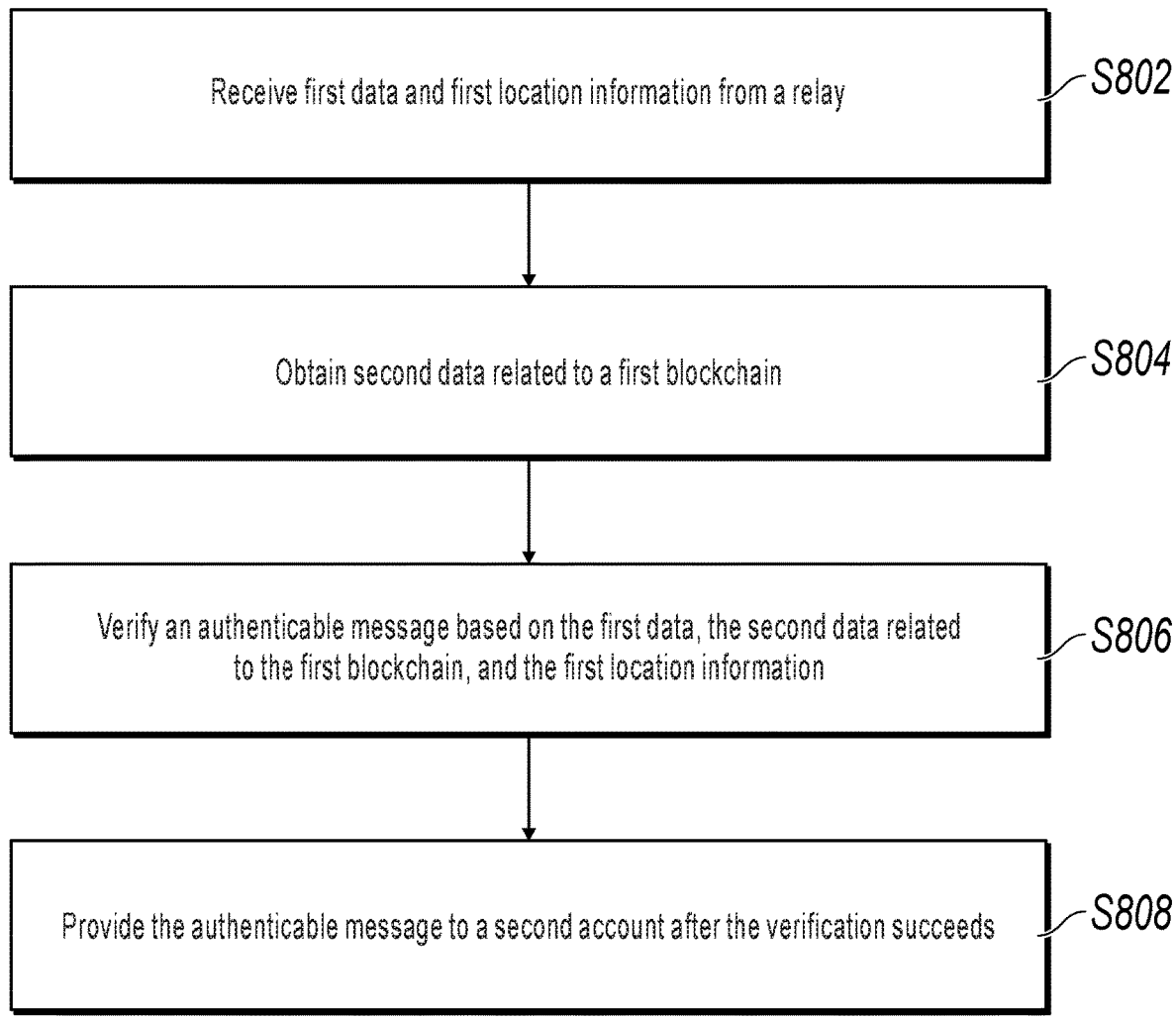
FIG. 8 is a flowchart illustrating a method for inter-blockchain receiving of an authenticable message, according to an implementation of the present specification.

FIG. 8 is a flowchart illustrating a method for inter-blockchain receiving of an authenticable message, according to an implementation of the present specification. The inter-blockchain receiving means receiving by a second account in a second blockchain from another blockchain, the second blockchain is connected to a relay, the second blockchain is synchronized, by using the relay, with at least one piece of second data related to at least one other blockchain, the at least one other blockchain includes a first blockchain, and the method is performed by the second blockchain, and includes the following steps:

Step S802: Receive first data and first location information from the relay, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and the second account, and the first location information indicates a location of the first data in the first blockchain.

Step S804: Obtain, based on the first blockchain identifier in the authenticable message, second data related to the first blockchain.

Step S806: Verify the authenticable message based on the first data, the second data related to the first blockchain, and the first location information.

Step S808: Provide the authenticable message to the second account based on the second account in the authenticable message after the verification succeeds.

The method shown in FIG. 8 corresponds to the relay in the method shown in FIG. 7. The method shown in FIG. 8 can be started after the method shown in FIG. 7 is performed. In the second blockchain, for example, when a plurality of verification nodes verify the authenticable message, the verification node is synchronized, by using the relay, with second data related to each other blockchain. The second data is used to verify the authenticable message. The verification node and the second data vary with a specific verification method. For example, when verification is performed by using a simplified payment verification (spy) method, the verification node is an spy node, and the second data is a block header of each block in a corresponding blockchain.

First, in step S802, the first data and the first location information are received from the relay, where the first data includes the authenticable message, the authenticable message satisfies the predetermined protocol stack, the predetermined protocol stack includes the layer 1 to layer 3 protocols from the exterior to the interior, the layer 1 protocol includes the sending blockchain identifier field, the receiving blockchain identifier field, and the layer 2 protocol, the layer 2 protocol includes the sending account field, the receiving account field, and the layer 3 protocol, the layer 3 protocol includes the message content field, the sending blockchain identifier field, the sending account field, the receiving blockchain identifier field, and the receiving account field respectively correspond to the following field values: the first blockchain identifier, the first account, the second blockchain identifier, and the second account, and the first location information indicates the location of the first data in the first blockchain.

As described above, for example, the first data is a receipt that has a predetermined flag and is obtained from a block in the first blockchain by using the relay. After obtaining the receipt and a location of the receipt from the first blockchain, the relay can forward the receipt and the location of the receipt to the second blockchain, so that each node in the second blockchain can obtain the receipt and the location of the receipt, and an accounting node, a verification node, etc. in the second blockchain perform the following steps S804 to S808.

In step S804, the second data related to the first blockchain is obtained based on the first blockchain identifier in the authenticable message.

The protocol stack shown in FIG. 4 can be further used in a hierarchical authentication process. The layer 1 protocol includes a sending blockchain identifier, and therefore can be used in an authentication process of the sending blockchain identifier. Therefore, the second data corresponding to the first blockchain can be first obtained from the locally stored second data based on the sending blockchain identifier (namely, the first blockchain identifier) in the layer 1 protocol. The protocol stack is hierarchically designed, so that in a process of performing the present step, only the sending blockchain identifier field in the layer 1 protocol is read, and specific content of the layer 2 protocol included in the layer 1 protocol does not need to be read.

In step S806, the authenticable message is verified based on the first data, the second data related to the first blockchain, and the first location information.

In an implementation, the first data is a first receipt in a first block in the first blockchain, the first location information includes a block number of the first block and a receipt number of the first receipt in the first block, and the second data related to the first blockchain is a block header of each block in the first blockchain. The verifying the authenticable message based on the first data, the second data related to the first blockchain, and the first location information first includes: verifying the sending blockchain identifier in the layer 1 protocol in the authenticable message. The verifying the sending blockchain identifier includes: verifying the sending blockchain identifier by using a simplified payment verification method (spy verification method) based on the first receipt, the block header of each block, and an additionally obtained Merkle tree path that is in the first block and associated with the first receipt. The first receipt comes from the first block in the first blockchain, and the Merkle tree path is obtained based on the first location information. The spy verification method includes the following specific steps: calculating a receipt hash value of the first receipt;

calculating a root hash value of a Merkle tree based on the Merkle tree path; and comparing the calculated root hash value with a root hash value of a receipt tree in a block header of the first block, to determine whether the first receipt is in the first block.

In an implementation, the spy verification method can further include: verifying, based on a location of the first block, whether the block header of the block is included in a known longest chain after determining that the first receipt is in the first block, to determine whether a consensus is reached on the first block. In an implementation, the blockchain identifier corresponds to a header hash value of a genesis block in the blockchain, and the spy verification method can further include: verifying, by using a header hash value and a parent hash value in the block header of the first block and the block header of each block, whether the header hash value of the genesis block in the blockchain corresponds to the first blockchain identifier.

In an implementation, with reference to the previous description of FIG. 3, the first receipt automatically generates a receipt that includes the log shown in FIG. 3 by invoking a first smart contract by using a second smart contract. In this case, the first receipt can prove that the first account in the authenticable message is an account that sends the message.

In an implementation, the first receipt is saved in the blockchain by sending a transaction by a user account (namely, the first account), and the authenticable message is added to transaction data by a user. After the first receipt is generated, the authenticable message is located in a first log in the first receipt. In this case, the verification further includes: verifying a sending account in the layer 2 protocol in the authenticable message. Specifically, whether the first account is an account that sends the authenticable message can be verified based on a sending field of the first log.

In step S808, the authenticable message is provided to the second account based on the second account in the authenticable message after the verification succeeds.

In an implementation, as described above, the second smart contract in the first blockchain transmits information to a third smart contract in the second blockchain by invoking the first smart contract, to invoke the third smart contract. In this case, the second account is a contract account of the third smart contract, and the authenticable message is, for example, an imported parameter of the third smart contract. Therefore, the providing the authenticable message to the second account includes: providing the authenticable message to the second account by invoking the third smart contract by using the authenticable message as an imported parameter. After the third smart contract is invoked, a specific service process is performed based on the layer 3 protocol in the authenticable message. It can be understood that the second account is not limited to a smart contract account. For example, the second account can be a user account. In this case, the authenticable message can be provided by a verification node to the user account by using a method (for example, a transaction sending method) commonly used in a blockchain.

Figure 9:
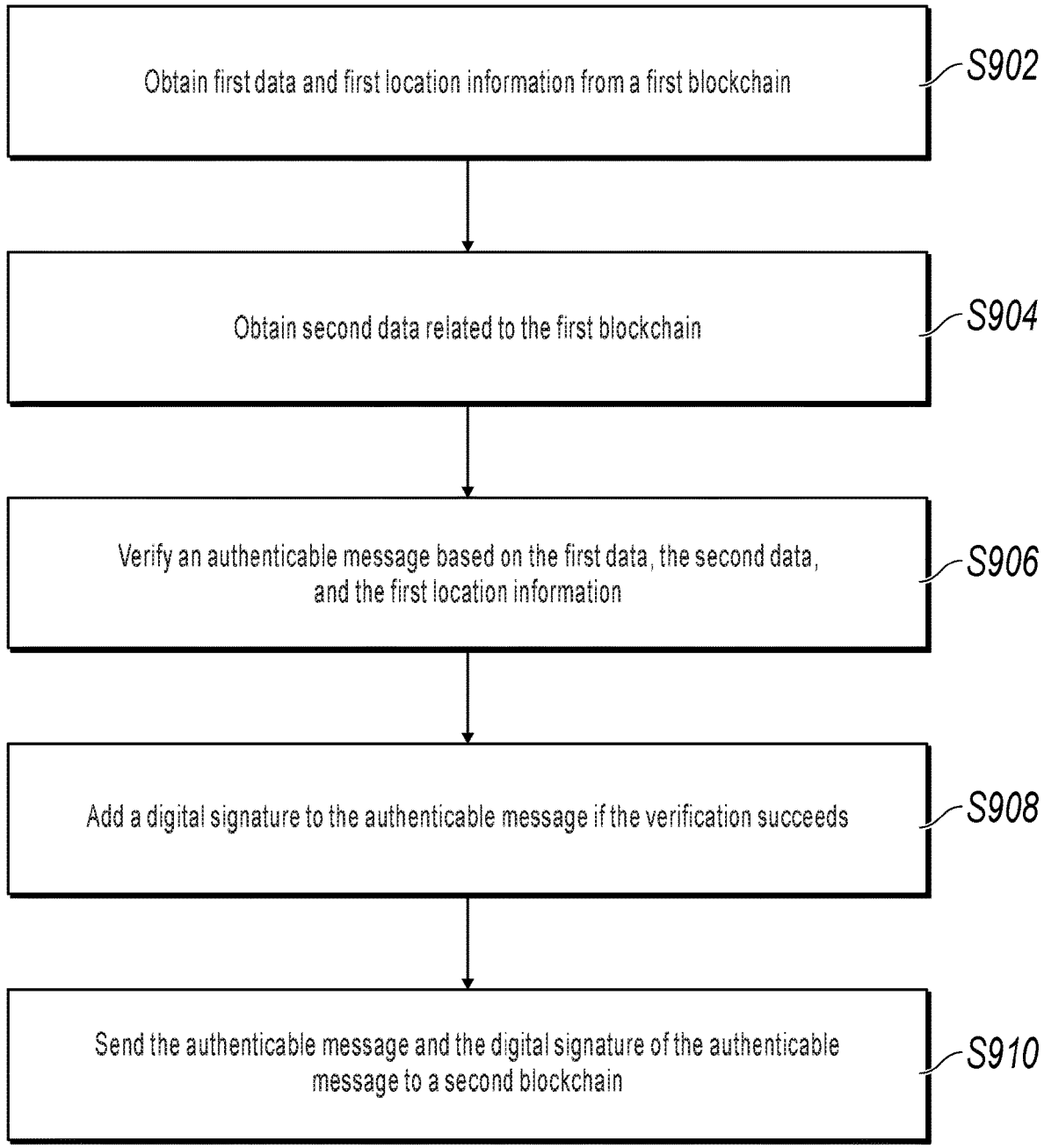
FIG. 9 is a flowchart illustrating a method for inter-blockchain forwarding of an authenticable message, according to an implementation of the present specification.

FIG. 9 is a flowchart illustrating a method for inter-blockchain forwarding of an authenticable message, according to an implementation of the present specification. The method is performed by a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, the relay is synchronized with second data related to each blockchain, and the method includes the following steps:

Step S902: Obtain the first data and first location information from the first blockchain, where the first location information indicates a location of the first data in the first blockchain.

Step S904: Obtain, based on the first blockchain identifier in the authenticable message, second data related to the first blockchain.

Step S906, Verify the authenticable message based on the first data, the second data related to the first blockchain, and the first location information.

Step S908: Add a digital signature to the authenticable message if the verification succeeds.

Step S910: Send the authenticable message and the digital signature of the authenticable message to the second blockchain based on the second blockchain identifier in the authenticable message.

In the method, the relay is a trusted node, or can be a verification blockchain. After obtaining the first data from the first blockchain, the relay can locally verify the first data, add a digital signature after the verification succeeds, and send the digital signature to the second blockchain, so that the second blockchain can verify the first data by using the digital signature added by the relay, thereby simplifying the process of performing verification by the second blockchain. For steps S902 and S910 in the method, references can be made to the previous description of steps S702 and S704. For steps S904 and S906, references can be made to the previous description of steps S804 and S806. Details are omitted here for simplicity.

Figure 10:
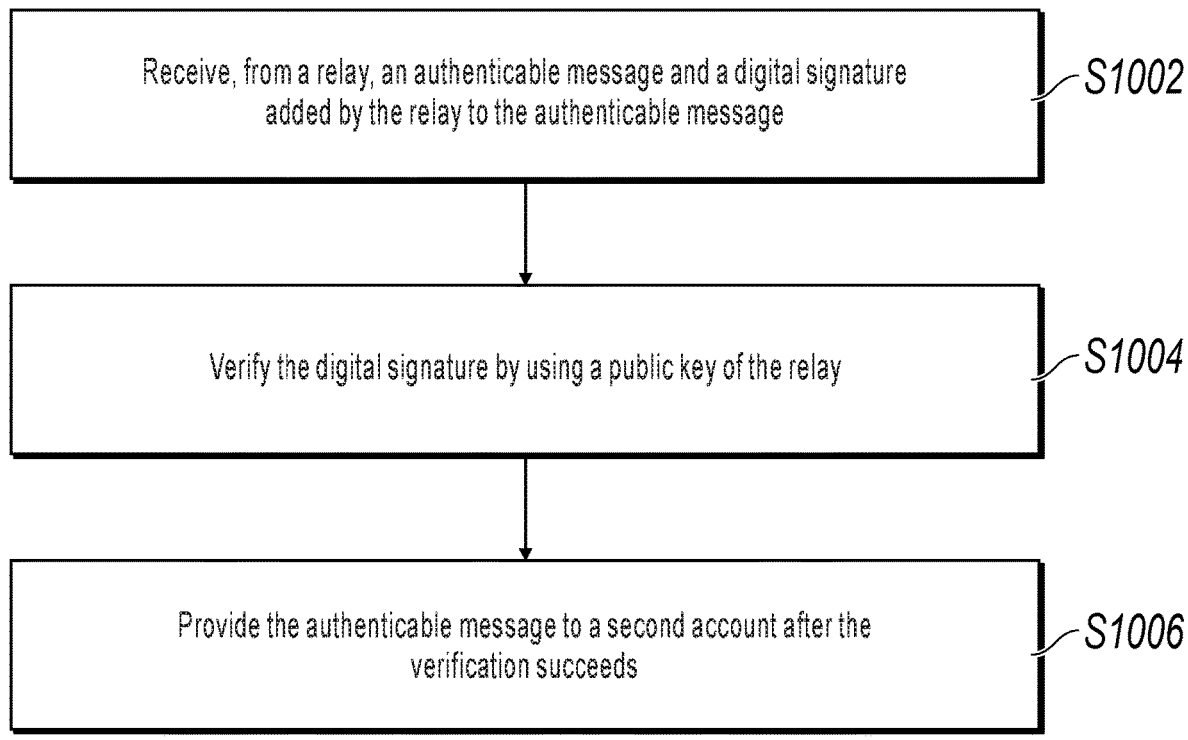
FIG. 10 is a flowchart illustrating a method for inter-blockchain receiving of an authenticable message, according to an implementation of the present specification.

FIG. 10 is a flowchart illustrating a method for inter-blockchain receiving of an authenticable message, according to an implementation of the present specification. The inter-blockchain receiving means receiving by a second account in a second blockchain from another blockchain, the second blockchain is connected to a relay, the relay is further connected to at least one other blockchain, the at least one other blockchain includes a first blockchain, the second blockchain pre-stores a public key of the relay, and the method is performed by the second blockchain, and includes the following steps:

Step S1002: Receive, from the relay, an authenticable message and a digital signature added by the relay to the authenticable message, where the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, a first account, a second blockchain identifier, and the second account.

Step S1004: Verify the digital signature by using the public key of the relay.

Step S1006: Provide the authenticable message to the second account based on the second account in the authenticable message after the verification succeeds.

The method shown in FIG. 10 corresponds to the relay in the method shown in FIG. 9. The method shown in FIG. 10 can be started after the method shown in FIG. 9 is performed. The method can be performed by any node or client in the second blockchain, and the node (or the client) can verify the authenticable message provided that the node (or the client) locally stores the public key of the relay. Therefore, different from that in the solution shown in FIG. 8, the first data does not need to be received from the relay, and only the authenticable message needs to be received. For step S1006, references can be made to the previous description of step S808. Details are omitted here for simplicity.

Figure 11:
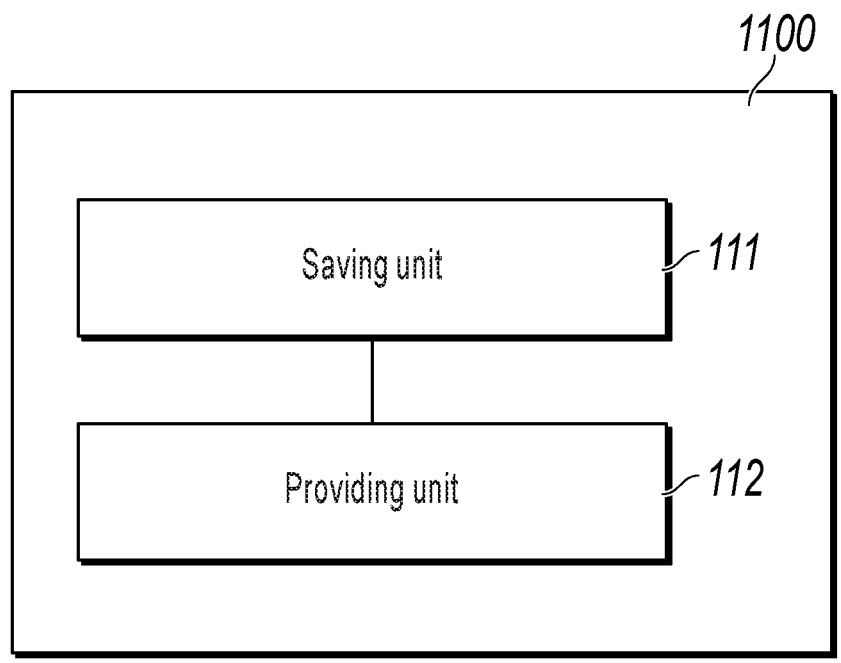
FIG. 11 illustrates an apparatus 1100 for inter-blockchain transmission of an authenticable message, according to an implementation of the present specification.

FIG. 11 illustrates an apparatus 1100 for inter-blockchain transmission of an authenticable message, according to an implementation of the present specification. The inter-blockchain transmission means transmission from a first account in a first blockchain to another blockchain, the first blockchain is connected to a relay, the relay is further connected to at least one other blockchain, the at least one other blockchain includes a second blockchain, and the apparatus is deployed in the first blockchain, and includes the following: a saving unit 111, configured to save first data on which a consensus is reached in the first blockchain by using the first account, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, the first account, a second blockchain identifier, and a second account; and a providing unit 112, configured to provide the first data and first location information to the relay, to provide the authenticable message to the second account in the second blockchain, where the first location information indicates a location of the first data in the first blockchain.

In an implementation, the saving unit 111 is further configured to save the first data in the first blockchain by invoking a first smart contract by using the first account, where the first account imports at least the following parameters to the first smart contract when invoking the first smart contract: the second blockchain identifier, the second account, and message content.

Figure 12:
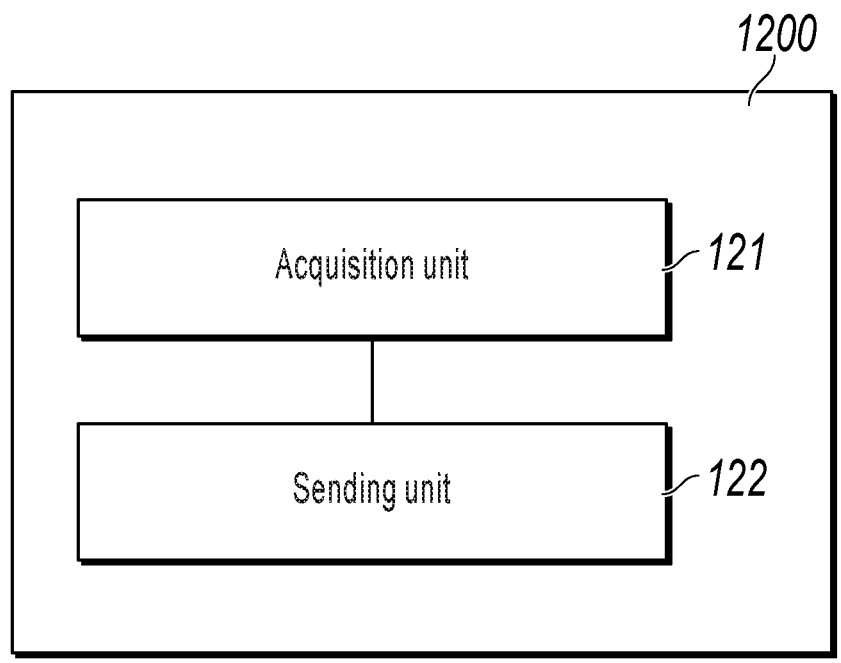
FIG. 12 illustrates an apparatus 1200 for inter-blockchain forwarding of an authenticable message, according to an implementation of the present specification.

FIG. 12 illustrates an apparatus 1200 for inter-blockchain forwarding of an authenticable message, according to an implementation of the present specification. The apparatus is deployed in a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, and the apparatus includes the following: an acquisition unit 121, configured to obtain the first data and first location information from the first blockchain, where the first location information indicates a location of the first data in the first blockchain; and a sending unit 122, configured to send the first data and the first location information to the second blockchain based on the second blockchain identifier in the authenticable message.

In an implementation, the first data is marked with a predetermined flag, and the acquisition unit is further configured to obtain the first data and the first location information from the first blockchain based on the predetermined flag.

Figure 13:
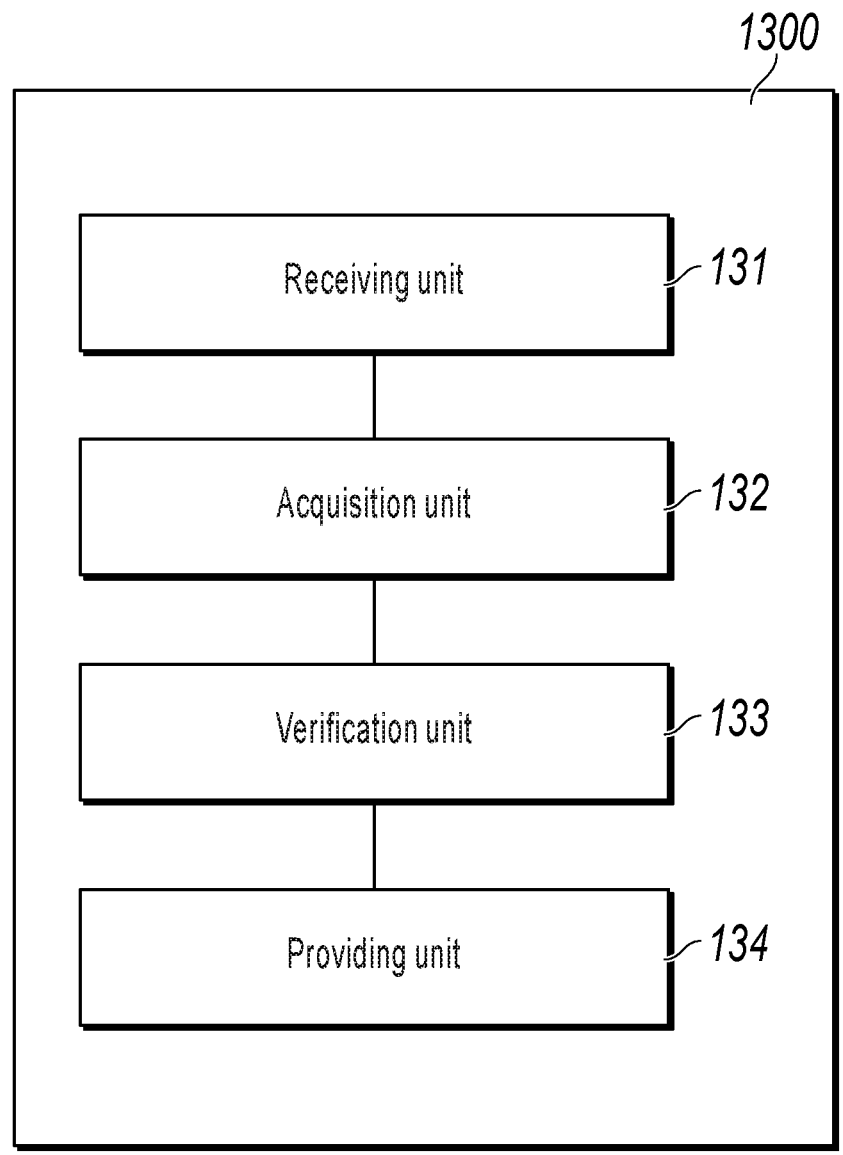
FIG. 13 illustrates an apparatus 1300 for inter-blockchain receiving of an authenticable message, according to an implementation of the present specification.

FIG. 13 illustrates an apparatus 1300 for inter-blockchain receiving of an authenticable message, according to an implementation of the present specification. The inter-blockchain receiving means receiving by a second account in a second blockchain from another blockchain, the second blockchain is connected to a relay, the second blockchain is synchronized, by using the relay, with at least one piece of second data related to at least one other blockchain, the at least one other blockchain includes a first blockchain, and the apparatus is deployed in the second blockchain, and includes the following: a receiving unit 131, configured to receive first data and first location information from the relay, where the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and the second account, and the first location information indicates a location of the first data in the first blockchain; an acquisition unit 132, configured to obtain, based on the first blockchain identifier in the authenticable message, second data related to the first blockchain; a verification unit 133, configured to verify the authenticable message based on the first data, the second data related to the first blockchain, and the first location information; and a providing unit 134, configured to provide the authenticable message to the second account based on the second account in the authenticable message after the verification succeeds.

In an implementation, the first data is a first receipt in a first block in the first blockchain, the first location information includes a block number of the first block and a receipt number of the first receipt in the first block, the second data related to the first blockchain is a block header of each block in the first blockchain, the verification unit 133 is further configured to verify the authenticable message by using a simplified payment verification method based on the first receipt, the block header of each block, and a Merkle tree path that is in the first block and associated with the first receipt, the first receipt comes from the first block in the first blockchain, and the Merkle tree path is obtained based on the first location information.

In an implementation, the authenticable message is located in a first log in the first receipt, and the verification unit 133 is further configured to verify, based on a sending field of the first log, that the first account is an account that sends the authenticable message.

In an implementation, the second account is a contract account of a third smart contract, and the providing unit 134 is further configured to provide the authenticable message to the second account by invoking the third smart contract by using the authenticable message as an imported parameter.

Figure 14:
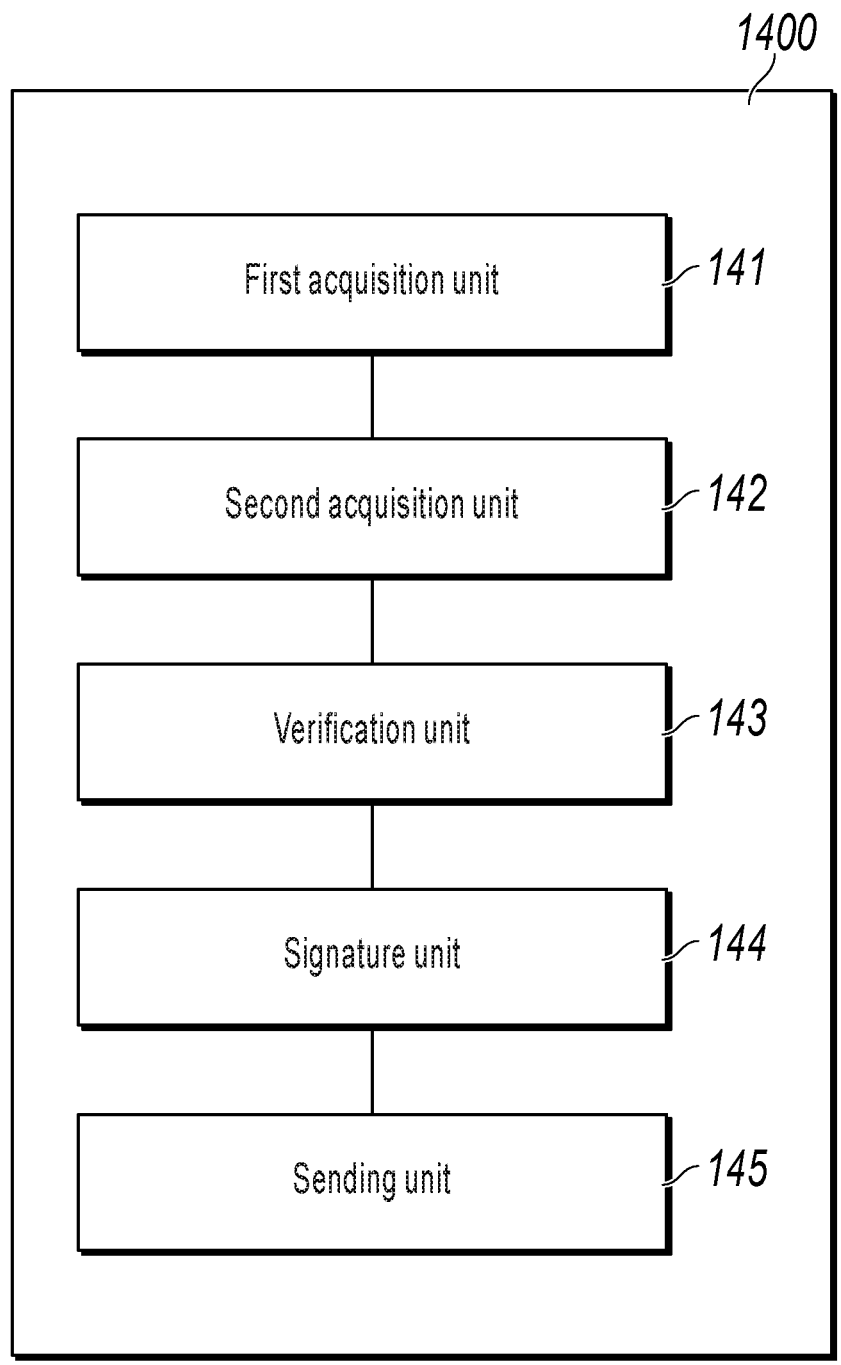
FIG. 14 illustrates an apparatus 1400 for inter-blockchain forwarding of an authenticable message, according to an implementation of the present specification.

FIG. 14 illustrates an apparatus 1400 for inter-blockchain forwarding of an authenticable message, according to an implementation of the present specification. The apparatus is deployed in a relay, the relay is connected to at least two blockchains, the at least two blockchains include a first blockchain and a second blockchain, the first blockchain pre-stores first data on which a consensus is reached, the first data includes an authenticable message, the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, the sending blockchain identifier field, the sending account field, the receiving blockchain identifier field, and the receiving account field respectively correspond to the following field values: a first blockchain identifier, a first account, a second blockchain identifier, and a second account, the relay is synchronized with second data related to each blockchain, and the apparatus includes the following: a first acquisition unit 141, configured to obtain the first data and first location information from the first blockchain, where the first location information indicates a location of the first data in the first blockchain; a second acquisition unit 142, configured to obtain, based on the first blockchain identifier in the authenticable message, second data related to the first blockchain; a verification unit 143, configured to verify the authenticable message based on the first data, the second data related to the first blockchain, and the first location information; a signature unit 144, configured to add a digital signature to the authenticable message if the verification succeeds; and a sending unit 145, configured to send the authenticable message and the digital signature of the authenticable message to the second blockchain based on the second blockchain identifier in the authenticable message.

Figure 15:
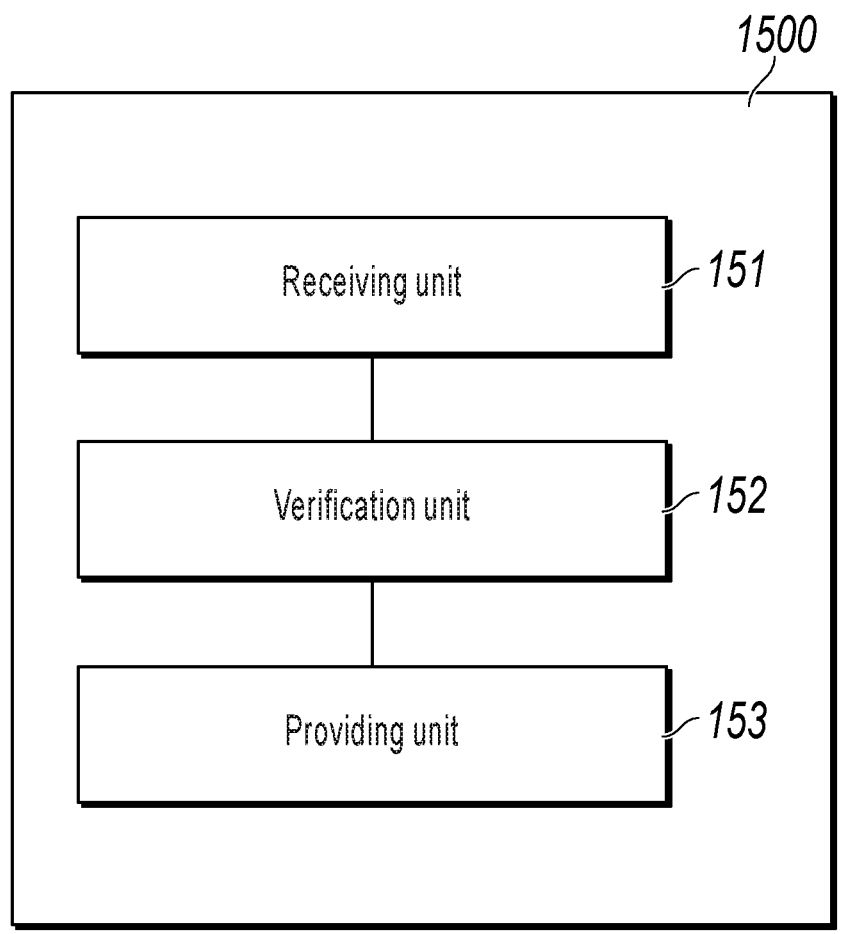
FIG. 15 illustrates an apparatus 1500 for inter-blockchain receiving of an authenticable message, according to an implementation of the present specification.

FIG. 15 illustrates an apparatus 1500 for inter-blockchain receiving of an authenticable message, according to an implementation of the present specification. The inter-blockchain receiving means receiving by a second account in a second blockchain from another blockchain, the second blockchain is connected to a relay, the relay is further connected to at least one other blockchain, the at least one other blockchain includes a first blockchain, the second blockchain pre-stores a public key of the relay, and the apparatus is deployed in the second blockchain, and includes the following: a receiving unit 151, configured to receive, from the relay, an authenticable message and a digital signature added by the relay to the authenticable message, where the authenticable message satisfies a predetermined protocol stack, the predetermined protocol stack includes layer 1 to layer 3 protocols from the exterior to the interior, the layer 1 protocol includes a sending blockchain identifier field, a receiving blockchain identifier field, and the layer 2 protocol, the layer 2 protocol includes a sending account field, a receiving account field, and the layer 3 protocol, the layer 3 protocol includes a message content field, and the sending blockchain identifier field, the sending account field, the receiving blockchain identifier field, and the receiving account field respectively correspond to the following field values: a first blockchain identifier, a first account, a second blockchain identifier, and the second account; a verification unit 152, configured to verify the digital signature by using the public key of the relay; and a providing unit 153, configured to provide the authenticable message to the second account based on the second account in the authenticable message after the verification succeeds.

Another aspect of the present specification provides a computer readable storage medium. The computer readable storage medium stores a computer program, and when the computer program is executed in a computer, the computer is enabled to perform any one of the previous methods.

Another aspect of the present specification provides a computing device, including a memory and a processor. The memory stores executable code, and when the processor executes the executable code, any one of the previous methods is implemented.

Based on the abstract blockchain interoperability model in the inter-blockchain solutions in the implementations of the present specification, an authenticable message is designed, so that a message sent from a blockchain can be authenticated by another blockchain: The blockchain from which the message is sent and an entity (an account/contract) that is in the blockchain and sends the message can be determined. Based on the authenticable message, inter-blockchain application (contract) programming is allowed, and therefore developers can easily develop various inter-blockchain services and applications. In addition, the authenticable message keeps relatively high expansibility and supports stacking protocol stacks, and therefore various inter-blockchain interoperability technologies and application scenarios can be standardized. Furthermore, the authenticable message can be implemented by a heterogeneous platform, so that only one inter-blockchain adaptation upgrade is implemented in a blockchain, and a plurality of inter-blockchain platforms and a plurality of blockchains can be connected.

It should be understood that the description such as "first" and "second" in the present specification is merely intended to distinguish between similar concepts for ease of description, and constitutes no limitation.

The implementations of the present specification are described in a progressive way. For the same or similar parts of the implementations, references can be made to the implementations. Each implementation focuses on a difference from other implementations. In particular, the system implementation is basically similar to the method implementation, and therefore is briefly described. For related parts, references can be made to partial description of the method implementation.

Specific implementations of the present application are described above. Other implementations fall within the scope of the appended claims. In some cases, the actions or steps described in the claims can be performed in an order different from the order in the implementations and the desired results can still be achieved. In addition, the process described in the accompanying drawings does not necessarily require a particular execution order to achieve the desired results. In some implementations, multi-tasking and parallel processing can be advantageous.

A person of ordinary skill in the art can be further aware that with reference to the examples described in the implementations disclosed in the present specification, units and algorithm steps can be implemented by electronic hardware, computer software, or a combination thereof. To clearly describe interchangeability between the hardware and the software, compositions and steps of each example are described above based on functions. Whether these functions are performed by hardware or software depends on particular applications and design constraints of the technical solutions. A person of ordinary skill in the art can use different methods to implement the described functions for each particular application, but it should not be considered that this implementation goes beyond the scope of the present application.

Steps of methods or algorithms described in the implementations disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described specific implementations, the objective, technical solutions, and beneficial effects of the present disclosure are further described in detail. It should be understood that the previous descriptions are merely specific implementations of the present disclosure, and are not intended to limit the protection scope of the present disclosure. Any modification, equivalent replacement, or improvement made without departing from the spirit and principle of the present disclosure should fall within the protection scope of the present disclosure.

What is claimed is:

1. A computer-implemented method for inter-blockchain, authenticable-message transmission, comprising:
    saving, by a first blockchain, first data on which a consensus is reached in the first blockchain by using a first account, wherein:
        the first blockchain is connected to a relay,
        the relay is further connected to at least one other blockchain,
        the at least one other blockchain comprises a second blockchain,
        the first data comprises an authenticable message,
        the authenticable message satisfies a predetermined protocol stack,
        the predetermined protocol stack comprises a layer 1 protocol, a layer 2 protocol, and a layer 3 protocol,
        the layer 1 protocol comprises a sending blockchain identifier field, a receiving blockchain identifier field, and the layer 2 protocol,
        the layer 2 protocol comprises a sending account field, a receiving account field, and the layer 3 protocol,
        the layer 3 protocol comprises a message content field, and
        the sending blockchain identifier field, the sending account field, the receiving blockchain identifier field, and the receiving account field respectively correspond to a first blockchain identifier, the first account, a second blockchain identifier, and a second account; and
    providing, by the first blockchain to the relay, the first data and first location information to cause the relay to provide the authenticable message to the second account in the second blockchain, wherein the first location information indicates a location of the first data in the first blockchain.

2. The computer-implemented method of claim 1, wherein the saving first data on which a consensus is reached in the first blockchain by using the first account comprises: saving the first data in the first blockchain by invoking a first smart contract by using the first account, wherein the first account imports one or more of following parameters to the first smart contract when invoking the first smart contract: the second blockchain identifier, the second account, or message content.

3. The computer-implemented method of claim 2, wherein the first data is marked with a predetermined flag.

4. The computer-implemented method of claim 3, wherein the first data comprises a receipt, the receipt comprises a log generated after the first smart contract is executed, and a data field of the log comprises the authenticable message.

5. The computer-implemented method of claim 4, wherein the log is marked with a predetermined topic, and the predetermined flag comprises the predetermined topic.

6. The computer-implemented method of claim 4, wherein the predetermined flag comprises an account identifier of the first smart contract.

7. The computer-implemented method of claim 1, wherein the layer 1 protocol further comprises a protocol version number field and a reserved field.

8. The computer-implemented method of claim 1, wherein the layer 3 protocol further comprises a type field indicating a usage scenario type of the authenticable message.

9. The computer-implemented method of claim 8, wherein the usage scenario type is one of a message type, a remote procedure call type, or a publish/subscribe type.

10. The computer-implemented method of claim 1, wherein the layer 3 protocol further comprises a sequence number field indicates a current sending sequence number when the first account sends an authenticable message to the second account for a plurality of times.

11. The computer-implemented method of claim 1, wherein the first account comprises a contract account of a second smart contract.

12. A computer-implemented system for inter-blockchain, authenticable-message transmission, comprising:
    one or more computers; and
    one or more computer memory devices interoperably coupled with the one or more computers and having tangible, non-transitory, machine-readable media storing one or more instructions that, when executed by the one or more computers, perform one or more operations, comprising:
        saving, by a first blockchain, first data on which a consensus is reached in the first blockchain by using a first account, wherein:
            the first blockchain is connected to a relay,
            the relay is further connected to at least one other blockchain,
            the at least one other blockchain comprises a second blockchain,
            the first data comprises an authenticable message,
            the authenticable message satisfies a predetermined protocol stack,
            the predetermined protocol stack comprises a layer 1 protocol, a layer 2 protocol, and a layer 3 protocol, the layer 1 protocol comprises a sending blockchain identifier field, a receiving blockchain identifier field, and the layer 2 protocol, the layer 2 protocol comprises a sending account field, a receiving account field, and the layer 3 protocol, the layer 3 protocol comprises a message content field, and the sending blockchain identifier field, the sending account field, the receiving blockchain identifier field, and the receiving account field respectively correspond to a first blockchain identifier, the first account, a second blockchain identifier, and a second account; and providing, by the first blockchain to the relay, the first data and first location information to cause the relay to provide the authenticable message to the second account in the second blockchain, wherein the first location information indicates a location of the first data in the first blockchain.

13. The computer-implemented system of claim 12, wherein the saving first data on which a consensus is reached in the first blockchain by using the first account comprises: saving the first data in the first blockchain by invoking a first smart contract by using the first account, wherein the first account imports one or more of following parameters to the first smart contract when invoking the first smart contract: the second blockchain identifier, the second account, or message content.

14. The computer-implemented system of claim 12, wherein the layer 1 protocol further comprises a protocol version number field and a reserved field.

15. The computer-implemented system of claim 12, wherein the layer 3 protocol further comprises a type field indicating a usage scenario type of the authenticable message.

16. The computer-implemented system of claim 12, wherein the layer 3 protocol further comprises a sequence number field indicates a current sending sequence number when the first account sends an authenticable message to the second account for a plurality of times.

17. A non-transitory, computer-readable medium storing one or more instructions executable by a computer system to perform operations for inter-blockchain, authenticable-message transmission, comprising:

saving, by a first blockchain, first data on which a consensus is reached in the first blockchain by using a first account, wherein:

the first blockchain is connected to a relay, the relay is further connected to at least one other blockchain, the at least one other blockchain comprises a second blockchain, the first data comprises an authenticable message, the authenticable message satisfies a predetermined protocol stack, the predetermined protocol stack comprises a layer 1 protocol, a layer 2 protocol, and a layer 3 protocol, the layer 1 protocol comprises a sending blockchain identifier field, a receiving blockchain identifier field, and the layer 2 protocol, the layer 2 protocol comprises a sending account field, a receiving account field, and the layer 3 protocol, the layer 3 protocol comprises a message content field, and the sending blockchain identifier field, the sending account field, the receiving blockchain identifier field, and the receiving account field respectively correspond to a first blockchain identifier, the first account, a second blockchain identifier, and a second account; and providing, by the first blockchain to the relay, the first data and first location information to cause the relay to provide the authenticable message to the second account in the second blockchain, wherein the first location information indicates a location of the first data in the first blockchain.

18. The non-transitory, computer-readable medium of claim 17, wherein the saving first data on which a consensus is reached in the first blockchain by using the first account comprises: saving the first data in the first blockchain by invoking a first smart contract by using the first account, wherein the first account imports one or more of following parameters to the first smart contract when invoking the first smart contract: the second blockchain identifier, the second account, or message content.

19. The non-transitory, computer-readable medium of claim 17, wherein the layer 1 protocol further comprises a protocol version number field and a reserved field.

20. The non-transitory, computer-readable medium of claim 17, wherein the layer 3 protocol further comprises a type field indicating a usage scenario type of the authenticable message.

* * * * *